INVENTOR.
Martin Gunnar Rejler
BY

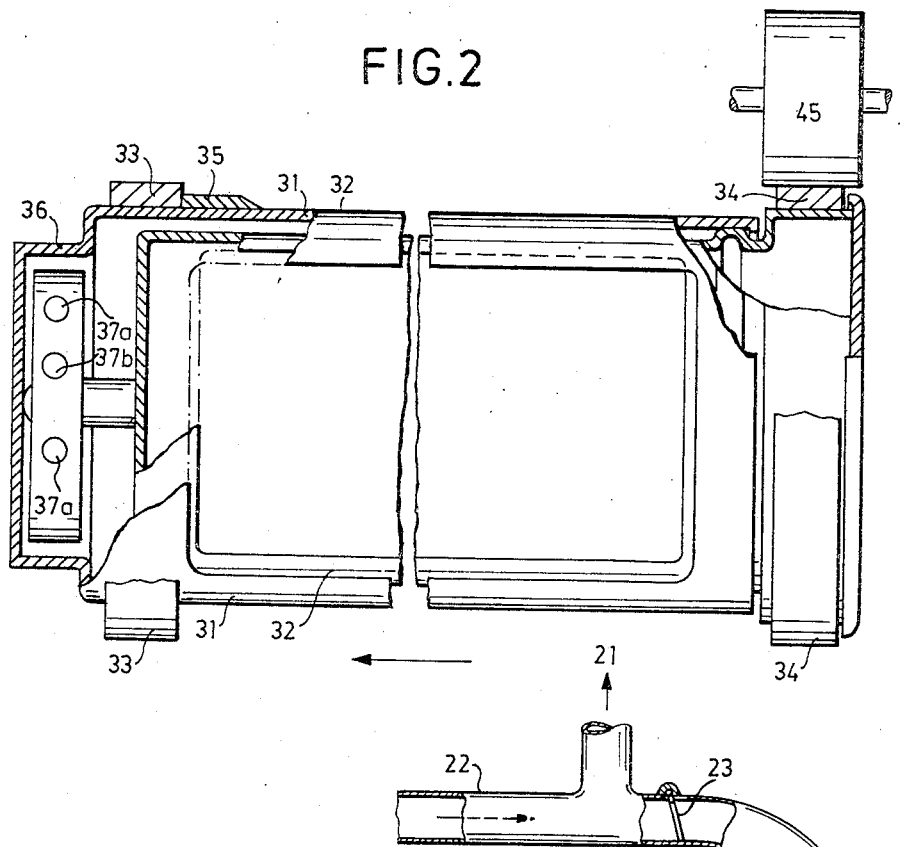
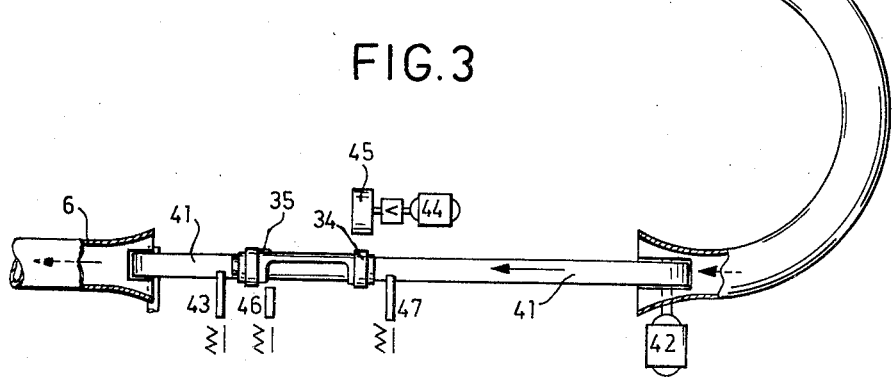

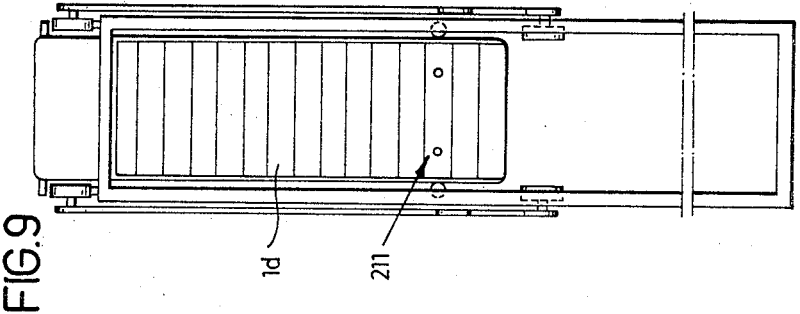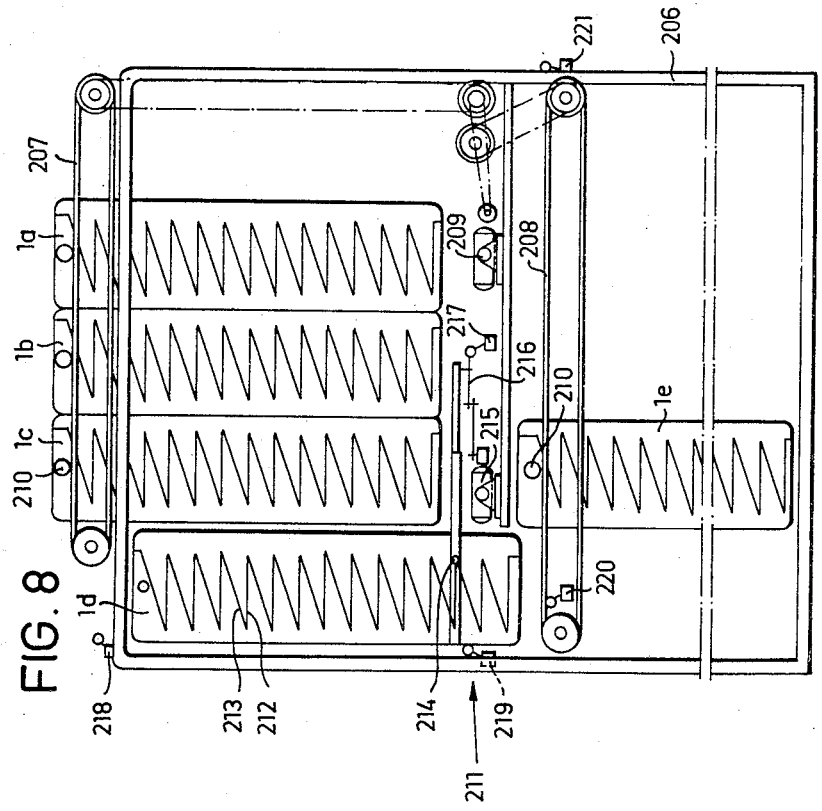

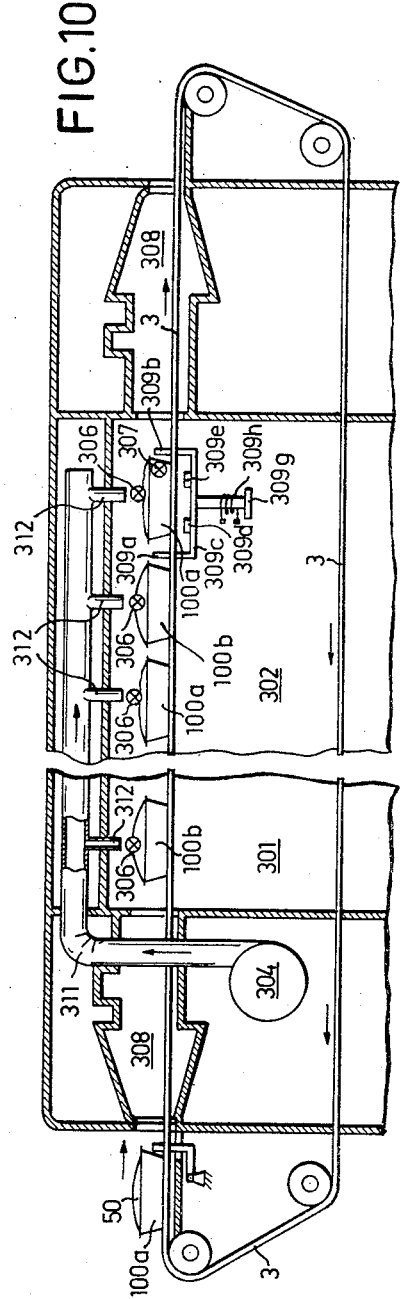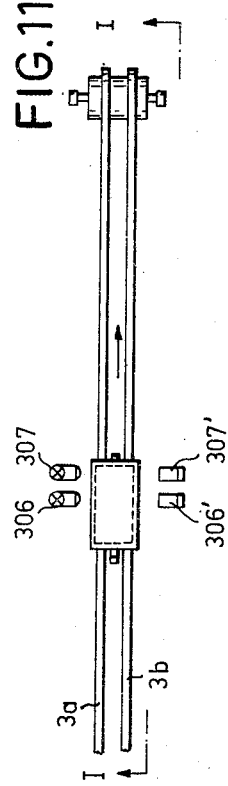

3,490,717
PNEUMATIC TUBE CONVEYER SYSTEM WITH AUTOMATIC FILLING AND EMPTYING OF MULTIPLE CIRCULATING CONVEYER CONTAINERS
Martin Gunnar Rejler, Vaxjo, Sweden, assignor to Rejlers Ingenjorsbyra AB, Vaxjo, Sweden, a corporation of Sweden
Filed June 27, 1967, Ser. No. 649,323
Claims priority, application Sweden, June 28, 1966, 8,798/66; Apr. 14, 1967, 5,232/67, 5,233/67
Int. Cl. B65g 51/04
U.S. Cl. 243—1　　　　　　　　　　　　　　　12 Claims

ABSTRACT OF THE DISCLOSURE

In a pneumatic tube conveyer system for the distribution of warm and cold food in hospitals, the pneumatic carriers remain within the system and are automatically loaded with food packages in a dispatch station and automatically unloaded in and returned to the dispatch station from one or more receiving stations. The food is packed in hermetically sealed packages stored in a food storage controlled by signals from order transmitters. These signals determine the number, type and address of the food packages to be fed out from the storage. Food packages to be warmed pass through an oven automatically controlled by the temperature and steam development, if any, in the packages. The packages are made of a combustible material withstanding a heat of about 100° C. and have the form of a dish or bowl. The food packages are delivered from a factory in shelf compartment assemblies each comprising a plurality of food packages. The shelf compartment assemblies and the food storage are such that each assembly may be inserted directly in the storage and are unloaded package by package in dependence of said order signals.

---

Pneumatic tube conveyer systems render possible very rapid transportation to several optionally selected receiving stations. However, there is generally a limitation of the transportation capacity with respect to both weight and volume of each transported unit, and the time required for each individual transportation operation, and moreover the cost of installation of such systems is comparatively high. It is difficult to arrive at a high degree of frequency in the container filling and emptying operations (container or carrier frequency), and considerable time is lost because of the necessity to perform these operations manually, a large number of expensive carriers generally being required. Accumulation of carriers at the dispatch and receiving stations pending manipulation by the attending service staff often makes it difficult to utilize the advantage of speed in such transportation systems.

For example, pneumatic conveyer systems distributing meals etc. in hospitals and other institutions with similar group servicing problems require a very high capacity during rush hours, several hundreds or even thousands of carriers with servings having to be transported during a very short time interval, maybe in the lapse of half an hour. If under such conditions the type of carrier now in general use should be employed, it would involve storage of hundreds respectively thousands of filled carriers, which considering the required investment and storage capacity would prove an almost impracticable proposition, and more so, if at least part of the contents of each carrier would have to be warmed up immediately before the distribution operation in order to permit the serving of a hot meal after the arrival at the receiving end.

According to the specifications of the Swedish patent applications Nos. 2231/62, 4386/62, and 8107/62, very cheap dispensable carriers containers transporting meals can be used, whereby the empty carriers are discarded, not having to be returned to the dispatch station or to any carrier storage or similar. The carriers themselves then constitute a kind of wrapping of the packages containing food servings for direct transportation by means of a pneumatic tube conveyor system.

However, the solution of the problem in accordance with the present invention is quite distinct and may in many cases prove to be more advantageous. It can be mentioned by way of example that dispensable carriers, more particularly such ones made of paper or plastic material, which have to be warmed up and subjected to transportation at high speed, having a temperature of about 70° C. or more cannot be permitted to be too thin a yielding, if they are going to resist against the stresses created by high acceleration and centrifugal forces during their transportation. Among other things, the whole system may be put out of function during a long period of time as a result of such a package bursting during its transit. On the other hand, the cost of a container should not be more than a fraction of the cost of its contents. However, in a system according to the claims of the present invention, comparatively expensive carriers for repeated use having a long life span can be used, and which are automatically filled with the desired object to be conveyed, which depending upon its nature can be put directly into the carrier or be enclosed in a cheap wrapping, for example a sealed bag of thin plastic material. When delicate goods are transported, the permanent type of carrier obviously constitutes a superior mechanical means of protection, and according to need offers a better heat protection than a cheap thin-walled dispensable carrier container.

In a system according to the invention, the theoretical transportation capacity and average speed can be utilized to a high degree. The time wasted in waiting upon empty return carriers and likewise the time required for the operations of emptying, filling and dispatching the carriers will be very short.

By way of example, the invention as well as examples of integrating details thereof are shown in the accompanying drawing, and will now be described.

FIG. 1 is a diagrammatical view of such a pneumatic tube conveyer system for distribution of food in hospitals. FIG. 2 shows a cartridge type carrier unit suitable for the system. FIG. 3 shows a carrier dispatch station (sending end) which can also be utilized as carrier receiving station. FIGS. 4 to 6, and FIG. 4A, being a top view of FIG. 4, each show one of three alternatives of carrier filling and/or emptying devices for sending and receiving ends, respectively, as for example according to FIG. 3. FIG. 7 is a diagrammatical perspective side elevational view of a shelf compartment to be used in the store shown in side elevation in FIG. 8. FIG. 9 is a diagrammatical rear end view of one shelf compartment assembly. FIG. 10 is a vertical longitudinal section of part of a multiple-stage microwave electronic furnace for heating the contents of the carrier cartridge in connection with the carrier distribution by means of the system. FIG. 11 shows a detail of a top view of said unit wherein the broken line I—I corresponds to the sectional plane of FIG. 10. FIG. 12 shows a food package to be used in a carrier cartridge, and FIG. 13 is a top view of the food package without the top foil thereof.

The conveyer system according to the invention, diagrammatically illustrated in FIG. 1 as an example, is supposed to be intended for rapid distribution of a great number of meal servings in hospitals, large cantonments etc. The meals are substantially ready cooked, and by way of example, packed in cheap tight plastic dispensable wrappings. Said wrappings are of uniform size, such as to permit them to be introduced into the carrier units described. These cartridge carriers as well as the wrappings of the meal servings are adequately heat resistant in case they are intended for food to be warmed up to such a temperature that the meals at least will keep at the desired eating temperature when reaching the consumer, i.e. one of the individuals served by the system.

A centralized store is provided with several storage bins 1 to house the ready packed meal servings, which are going to be warmed up, and several storage bins 2 for meal servings to be served and consumed without previous warming up procedure. The food storage as well as other integrating parts of the plant will be described in detail in the following, but first a description will be made of the system and of its general function and also as much of its detailed functioning as deemed necessary.

Operative function of the system

From storage bins 1 at least one route of transportation 3 leads to furnace 5 and from there to a carrier dispatch station 20a. From bins 2 at least one route of transportation 4 leads directly to dispatch station 20a. Via pneumatic tube 6 the dispatch exit is connected with main switch point 7a for distribution of the carrier units to the desired destination points (receivers 20b), whereby said switch point 7a may be located at a long distance away from the food storage and its dispatch station, for example in another building. From exit of main switch point 7a leads to for one part rising tube 8 to several branch switch points 10a, connected in series with each other, and for another part, to tube 9 to one or more additional switch points in another building. From branch switch points 10a, branch tubes 11 lead each one to its destination point 20b, where the food packages are removed from the carrier units. The emptied carriers continue via return branch switch points 10b, a return main switch point 7b, and a common return tube 22, to an entrance at the dispatch station 20a. During this transit, said carriers pass by a branch leading to a suction ventilator 21, and through gate 23 which latter functions as check valve or lock. Similar suction ventilators 21, as well as branches and gates 23, may be arranged at points near receiving ends 20b in order to increase transportation speed and service reliability. Order transmitting devices, making it possible to specify individual dishes, may be arranged at the receiving ends, and may consist of dials, rotatable selector knobs or push buttons, in order to produce electric signals representing the desired dish and number of meals or dishes required. As an alternative, one only or more (very few) intermediate order transmitting stations may be located elsewhere, for the purpose of receiving incoming orders by telephone, electric signals or order cards (suitably punch cards or similar arrangements), assorting them and thereafter retransmitting the instructions.

The system operates in the following manner. From anyone of the receiving points 20b a certain number of hot dishes of a single type is ordered. The order arrives in the form of coded electric impulse signals and is automatically switched to bin 1 in the food storage, where the desired dish is stored. Actuated by said pulse signals, delivery devices deposit the package, one at a time, from the bin contents on a conveyer belt or in a chute, which may occupy all or part of the transportation distance 3. The packages pass through furnace 5 at constant speed, whereby the heating temperature is automatically adjusted or regulated. As an alternative the packages pass the furnace with an adjusted regulated speed cycle, whereby the heating temperature is kept constant, the food in both alternatives acquiring the desired temperature. Said packages subsequently continue their passage to dispatch station 20a. In a similar way possibly cold dishes ordered are forwarded from storage bins 2 via transportation path 4 to dispatch station 20a.

An open carrier cartridge unit is in place ready to receive the package conveyed to the dispatch station, said package falling into the open carrier container by gravity or being otherwise introduced into the same. Thereby a light beam may for example be interrupted, actuating a photoelectric cell, which brings about the closure of the carrier cartridge. Also the increase in weight of the carrier or any other suitable criterion may be utilized to bring about the closure of the carrier unit. Once the closing operation is finished completely, a signal is generated, for example a signal generated by a photoelectric cell, which starts a conveyor belt or makes the carrier unit slide or fall down on a belt conveyor in perpetual movement transporting the carrier unit to the main tube 6 of the pneumatic system, forwarding the carrier to main switch point 7a and subsequently to tube 8, the branch switch point concerned 10a, and the final destination 20b, either directly or indirectly, in the latter case by actuation of the order giving signal. Before arriving at the destination point, the speed of the carrier is slowed down by braking action taking place in an arched portion of the tube in conventional manner, whereafter said container is deposited on a belt conveyer, belonging to the equipment at the receiving end, said belt conveyer transporting the carrier to the point, where the emptying operation takes place, the carrier being turned into the correct angular position, and after this movement has been completed the carrier is opened by action of a photoelectric device. After its contents have been removed, the carrier cartridge is again closed, the latter operation taking place for example by the food package when dropping down from the carrier interrupting a light beam of a photoelectric device, thereby creating the impulse o close the carrier. The empty carrier is returned to the dispatch station 20a by the suction force of the pneumatic system passing return switch points 10b and 7b, respectively, said switches possibly being operated by the carrier cartridge itself in a way similar to the automatic operation of a railway switch actuated upon by an onrushing train. However, said switches suitably may be governed by signals from the ordergiving device at the receiving end. The empty carrier travels back to the dispatch station 20a by return tube 22, its speed being reduced by the passage through an arch of the tube of 180°, so that it reaches the dispatch point at a low speed.

The carriers thus circulate within the pneumatic conveyer plant without leaving same. Depending upon the size of the installation and its desired handling capacity (maximum number of carriers conveyed per minute) etc., the plant is equipped with a certain number of carriers, the minimum being one single unit. Thus, the system houses a stock of carriers, for example by arranging that the carrier path within the dispatch section 20a is made as long or longer than the total length of a chosen number of carriers (added together). When the dispatch station is in a non-operating phase, the first carrier is open with its orifice in loading position, in the particular case thus upwards. When a food package from the food storage bin drops down in the carrier cartridge, thereby releasing a signal as previously mentioned, such a signal starts at least one electric motor in the dispatch section, the carrier is closed, whereafter it is moved into the pneumatic conveyer tube 6, and at the same time, the next carrier cartridge is fed into loading position in the dispatch station. How this is carried out in detail will be disclosed further below.

The statement above that, according to the invention, the carriers do not have to leave the conveyer system may also be expressed in the terms that the carriers neither before nor during or after a transportation cycle require manipulation by hand, not even during the emptying operation at a receiving station. The transportation capacity therefore can be increased to a very high degree, the carriers circulating close upon each other in the system. Because of the fact that the top speed of the carriers can be very high, for example 10 metres per second, whereby the overall operative speed of the system will be high, a very great number of carriers can be effective for handling the transportation during each unit of time.

If the dispatch unit and the switch points permit passage of only one carrier at a time, the transportation capacity of the system under operative conditions will be determined by these elements and not by the speed of the carriers and the minimum distance that can be kept between them in the pneumatic tubes. According to requirements, the sending station as well as the switch points, the furnace 5 and each one of the transportation paths 3, 4 (especially such sections not constituting pneumatic tubes) can be made for parallel simultaneous handling of several carriers. In order to prevent collisions, when the carriers emerge out of their respective elements, the parallel transportation branches for each one of the parallelly handled carriers may be synchronized with respect to the starting moment for each individual carrier to be fed out into the system, so that a determined variance in time is obtained between one shot and another, the result being that the carriers are fed out in some kind of rotation. If the sending station is equipped to deal with, say, five parallelly transiting carriers, and if the handling time with respect to one single carrier is T, then the sending station can deliver five carriers during the time T, the lapse of time passing between one delivery and another being on an average $T/5$.

Now the most important elements of the system will be described individually.

The carrier cartridge (FIG. 2)

FIG. 2 shows diagrammatically a container or carrier cartridge suitable for the system, partly in longitudinal section. This carrier comprises an outer cylindrical sleeve 31 and inside the same a pivoted sleeve 32 also of cylindrical shape. Each one of the sleeves has an opening in its cylindrical wall extending circumferentially about 180° and in axial direction as much as possible of the total length of the sleeve, in any case substantially more than half of the axial length, suitably equal to or larger than the space intended to be filled with a food package. The two sleeves 31, 32 can be relatively rotated such that their respective openings are brought to coincide, at least approximately (see FIG. 2). By further rotation of 180° relative to each other the openings will be brought to face the solid portions of the sleeves, the carrier in such condition being closed.

Each one of the sleeves 31, 32 is provided with its jointing or guide ring 33 and 34, respectively, made of a web as felt or similar, and each sleeve is provided with at least one end wall. In addition, the sleeves are provided each one with its disc shaped coaxial body 36, 37, one coaxially inserted into the other, at least the outer body 36 therefore being hollow. The inner body 37 is provided with a hole or passage 37 extending tangentially. The outer body 36 is provided with two such passage perforations, of which one is indicated at 37b in the drawing, the other one being coaxially located in relation to a corresponding tangential passage perforation 37a in the inner body 37 as seen in the position the carrier has in the figure. If the two sleeves are rotated 180° in relation to each other, so that the carrier will be closed, the single passage perforation 37a of the inner body 37 will be coaxially located with the passage perforation 37b in the outer body. In the position of the carrier shown in FIG. 2, where it is open, a light beam passing through hole 37a thus continues unobstructed through both the bodies. When the carrier is closed, a light beam can only pass through the perforated passage 37b and the two bodies 36, 37. Employing two photoelectric cells in alignment with 37a and 37b one can thus accurately establish, whether the carrier is open or closed, provided that the carrier occupies entirely one and the same angular position in both cases.

In order to arrest the carrier in the predetermined angular position such that the opening of said carrier always is facing the predetermined radial direction, which in the system described is upwards, one of the sleeves, in the present case, the outer one 31, is provided with a shoulder 35. If a wheel 45 of a rotary friction drive is applied against the inner sleeve, for example against its ring of felt, or better still, against a special friction ring on the sleeve, not shown, of a somewhat smaller diameter, then the entire carrier is pivoted around its longitudinal axis until the shoulder 35 will come to rest against a fixed stop dog (not shown), which does not belong to the carrier structure, but constitutes an integrating part of each sending and receiving station 20a and 20b, respectively, where each arriving carrier in this way is pivoted until it occupies a predetermined position for filling and emptying operations. The friction wheel 45 then continues to drive the inner sleeve 32, the outer sleeve in the meantime being kept motionless by the shoulder 35 resting against the stop dog mentioned, with the result that the sleeves are rotated about 180° relative to each other and the carrier is opened for filling and emptying. A continuation of the relative pivoting movement past the open position shown in FIG. 2 can be prevented by stopping the movement of the friction wheel or arranging that its contact is released. The friction wheel 45 or its driving device can be inactivated by means of the photoelectric signal mentioned above, as soon as the hole 37a will have reached the position 37b. The above involves that the whole friction resistance of the carrier against rotation by the action of the wheel 45 is less, and remains less, than the friction resistance created by the relative rotation of sleeves 31, 32 until the continued rotation of the carrier is stopped by the shoulder 35. Wheel 45 should rather not slip against the carrier. These requirements are very easy to satisfy. The holes 37a and 37b and their resultant interaction by means of photoelectric devices can also be of possible use for an exact axial positioning of the carrier in the dispatch and receiving stations, respectively.

The starting of the rotatary movement of the carrier is initiated by switching on the motor 44 or pivoting the wheel 45, and also by action of the carrier itself by arranging such that the carrier closes a circuit at or on the stop dog 43, or upon its arrival at that point interrupts a light beam to a photoelectric cell or similar arrangement. Additional embodiments of the carrier may also be derived from the claims.

It should be understood that also other means may be used automatically to open and to close the carriers, for example by a large hinged flap mounted on the cylinder wall or by means of a lock positioned on one end wall (the right-hand end wall in FIG. 2) or else by designing the carrier to be comprised of two hinged halves of a cylinder. The shoulder 35 can be substituted by, for example a radial rabbet, step, guiding flange or recess in the body 36 or on the same. Body 36 or the opposite end wall of the carrier can be shaped or provided with a projection of conventional type that the carrier is rotating by itself to the desired predetermined angular position and, moreover, will occupy a desired axial position, when the projection engages or penetrates into a hole in a removable stop dog for the said carrier. Such a hole and/or the projection mentioned then has to be given a curved guiding contour functioning in such a way that the projection can start its penetrating movement into the hole in any angular position and then be rotated to predetermined position independently of the relative starting angle of the projection and the hole, respectively. The stop provided with said hole may be of split type and arranged to automatically be removed from its resting position out of the path of the carrier, and thus to release the carrier in response to an output of the photoelectric cell, which detects that the filled carrier (at the receiving end this condition concerns the emptied carrier) has been closed.

Dispatch and receiving stations (FIGS. 3–5)

The dispatch and receiving stations 20a and 20b, respectively, in FIG. 1 may be identical, at least in all their essential details, and will therefore be described in common and, thus, the description of examples below will be referred to as concerning the dispatch station only unless otherwise mentioned.

FIG. 3 shows the dispatch station in very diagrammatical outlines, because of the description of the system above and of the carrier already provides certain indications and explanations.

Empty carriers arrive at the dispatch station by pneumatic tube 22, whereby they pass the branch to suction ventilator 21 and via a lock flap 23 and an arched portion of the tube for the purpose of braking the speed, so that it arrives at a relatively low speed at conveyer belt 41, driven by motor 42, said conveyer belt either being in perpetual movement or being started by a signal generated by the arrival of the carrier. The carrier has previously been opened and emptied of its contents at one of the receiving stations 20b and will arrive open. The receiving stations may also be designed to the effect that they close the carriers after the emptying operation and consequently they have to be opened at the dispatch station as a first step.

Conveyer belt 14 feeds carrier 39 in the angular position it may occupy to a stop dog 43, while the conveyer belt can continue working (operating), thus only sliding against the now motionless carrier. When carrier 39 reaches stop dog 43, or at a short distance ahead of said stop dog, a spacer bar 47 is moved in position behind the carrier to prevent a subsequently arriving carrier to contact and rest against the inoperative carrier. Behind such a second carrier still further carriers may arrive and be arranged to occupy positions immediately after one another or in a way that additional spacer bars will enter into action in rotation, whereby each one of such additional spacer bars may constitute a stop dog with a function equivalent to the one of the first stop dog provided for the first arriving carrier.

Against the first arriving carrier 39, resting against stop dog 43, friction wheel 45 is applied for example by switching on motor 44, which thereby pivots together with friction wheel 45 towards carrier 39, so that the carrier is engaged by the friction wheel, see also penultimate paragraph of the chapter dealing with the carrier. As already has been described in connection with the carrier itself, the whole carrier unit is now pivoted as far as its shoulder 35 (FIG. 2) is stopped by stop dog 46 or alternatively by stop dog 43, whereafter friction wheel 45 only is pivoting one of the sleeves (the inner one) of the carrier until said carrier is completely open, whereafter a photoelectric cell gives an output in the manner already described. This output stops the motor or lifts friction wheel 45 away from the sleeve forcing or permitting a filling device described below to fill the carrier with one serving. A food package already fed in position by an order giving signal is now released by the aforementioned output of the photoelectric cell and drops down through the opening of the carrier, whereby a light beam illuminating another photoelectric cell will be interrupted during a short interval, thereby again starting the motor 44 or applying friction wheel 45 against carrier 39 closing the same. The closing operation can suitably be carried out by the carrier sleeve 32, FIG. 2, being rotated in the same direction as when it was opened. The application and removal of motor 44 along with friction wheel 45 can be made in some conventional manner, for example, by arranging that switching on the motor for forward march (pivoting the carrier) will result in application, while switching on the motor in reverse will result in removal. A free-wheeling device on the motor axis can for example prevent the friction wheel to be driven in the reverse.

Motors 42 and 44 may be substituted by one single motor, which for one part drives the conveyer belt and for another pivots carrier 39, closing the same by the arrangement of an electromagnetical device applying friction wheel 45 against the carrier, the operation for the rest being carried out as described above.

Conveyer belt 41 is suitable but not absolutely essential and can be substituted by a sliding chute or shaking vibration channel, whereby the carriers slide to engagement with the stop dog 43 by gravity.

FIG. 4 shows diagrammatically an example of a filling device at the dispatch station 20a, FIG. 1, to convey the food packages to the carriers, illustrated from above (top illustration in FIG. 4) and also viewed from one side in the longitudinal direction of the carrier. The food packages 100 are transported by a conveyer belt 48 between two guide rails 49. The conveyer belt terminates or will cease to function immediately ahead of the carrier, above the same. The first package 100 in the row is introduced by conveyer belt 48 into a pocket in a pivotable sheet metal flap 101, which is shown in resting position. The signal obtained, when the carrier has been pivoted to the correct position with its side opening turned upwards, actuates an electromagnet 102, which pivots flap 101 in counter-clockwise direction as per the arrow in FIG. 4, so that the first package 100 is pivoted sliding on the conveyer 48 and thereafter drops down in free fall into the open carrier. The package thereby interrupts during a short interval a light beam to photoelectric cell 103, which is the one whose signal then causes the closure of the carrier by means of the friction wheel mentioned previously (or else in other manner). In order to avoid that a carrier will be closed before the servings package will have got in correct position inside the carrier, only the final phase of the signal is employed for starting the closing of the carrier, for example by biasing the signal in its final phase generating an operative impulse in conventional manner. Flap 101 pivots back so that its pocket again will fall in alignment with the packages 100 on the conveyer belt 48 ready to receive next package. Both guiding rails 49 terminate close to the flap 101 in such a manner shown in FIG. 4 so that, also during the phase of the pivoting movement of the flap, package 100 in position in the flap pocket cannot leave the pocket, as long as the package remains on the conveyer belt 48.

As already mentioned, the carriers and the dispatch station can be arranged for loading operation of the carrier via an end wall of the carrier. By way of example this can be carried out by feeding the food packages via a gravity chute or tube, at the bottom of which they are manipulated out of the chute in axial direction by means of an electropneumatic plunger and introduced into the carrier, whereby the details taking part in this operation, viz. the exit of the chute or tube, the plunger and the means for axially directed transportation of the carrier (conveyer belt or similar) are arranged to the effect that the movement of the carrier is not obstructed by the chute and plunger, respectively, except during the phase of loading the carrier with a food package.

In certain instances it can be of advantage that the carrier, for the operation of filling (loading) or emptying, is conveyed into a fork shaped blind alley, entering by one of its legs or branches to be loaded (or emptied) at the end of the same and leaving by the other fork leg of the blind alley.

Instead of the means comprising a pivotable flap 101 illustrated in FIG. 4 one can employ conventional means of transportation to feed objects one at a time, for example using conveyer belts or revolving tables for feeding bottles one at a time either from an inclining or standing position.

FIG. 5 illustrates quite diagrammatically a sending or receiving station, where the carrier is filled (or emptied)

via one of its end walls. Carrier 39 in this case is supposed to comprise a sleeve of the shape of a cylinder longitudinally split in half, the ends of which are provided with rings, surounded each one of its guiding or jointing ring of felt or similar material. In this sleeve of the shape of one half of a longitudinally split cylinder a receptacle of complete cylindrical form with one of its end walls completely uncovered is pivotably mounted, the other end wall—in the present case the one facing downwards—being completely closed. This receptacle can be swung out by a hinge or similar means from the sleeve shaped like one-half of a longitudinally split cylinder, the swinging movement once completed, the receptacle having emerged in its entirety out of the sleeve occupying a parallel position to the same.

The carrier to be filled moves in the direction the arrow indicates in the figure, i.e., downwards through a pneumatic tube 22 after having been braked in conventional manner. The carrier then reaches an electromagnetically manipulated stop bar 43, where its travel is stopped. In the same or similar manner as shown in FIG. 4 the carrier is pivoted to a predetermined angular position until for example a shoulder on the carrier will come at rest upon a fixed dog (corresponding 35 and 46 in FIG. 1). The pivotal movement of the carrier to said predetermined angular position is carried out by means of a motor 44. Once the carrier has been brought to this position, said motor or another one makes the pivotable receptacle in the carrier swing out of the same to the position 39b indicated with dashed lines in the figure. This pivotal movement can be carried out by more or less the same means and in the same way as the pivotal movement of the inner sleeve 32 illustrated in FIG. 3 is done in accordance with FIG. 4. Above this position the food packages 100 are fed one at a time by means of a conveyer 48. The first package 100 in the row (the left one) is dropped through a device of sheet metal atcing as hopper 42 into the receptacle, which occupies the position 39b in the drawing, which receptacle thereafter is swung back into the carrier 39, possibly being locked once in its swung-in position, whereafter the stop bar 43 is disengaged and the now filled carrier 39 will continue its travel down through the exit tube 6. The analogue embodiment of the other necessary details of this device and the ones according to FIG. 4 is obvious, which also rules for their operative functions in other respects not being described above.

The just described device can as well be employed as receiving device for emptying the carrier 39, if the whole arrangement according to FIG. 5 is turned upside down, whereby the conveyer 48 may be dispensed with. The open end wall of the inner receptacle of the carrier will then be facing downwards on the arrival of the carrier at the receiving end, so that the food package will drop out of the same, possibly on a conveyer belt, if such a device is installed. One can also use a receptacle with two open end walls. By known conventional means (a sheet metal shield plate or similar) one can easily obtain that the package will not drop out of the receptacle until the same has been completely swung to the desired position. If the device illustrated in FIG. 5 shall be employed as receiving station or alternatively as dispatch station, then the hinge device 42 must permit function in both directions. If not, it must be made turnable or permit substitution by another similar device.

The food storage (FIGS. 7 and 8)

As mentioned above, the food storage is supposed to comprise two groups of storage bins 1 and 2 housing food packages to be distributed either cold or warmed in a furnace 5 which will be described in more detail in the following chapter. Of course, there can be more than two groups of storage bins, more particularly an additional group for separately stored deep freezed food which must be subjected to a quick thawing up procedure in furnace 5 (or in a separate furnace) or else be slowly thawed up in a separate furnace section of independent furnace. The term "furnace" must not be understood too literally in this connection.

Each group of bins 1 and 2 may consist of one or more devices for handling of food packages such that each device makes possible a simplification of the handling of packages at a factory delivering complete sealed food packages, and at the place of consumption at the same time as the transportation from the factory to the place of consumption is facilitated, thereby permitting the handling operations to be automatized to a large extent. By way of example, a suitable food package handling device is shown in FIGS. 7, 8 and 9 and will now be described.

FIGURE 7 shows a diagrammatical perspective side elevational view of a shelf compartment assembly of the kind used in the store shown in diagrammatical side elevation in FIG. 8. FIGURE 9 is a diagrammatical rear end view of one shelf compartment assembly being in position for step-by-step downfeed.

A store as illustrated in FIGURE 8, may be installed in the food factory for filling of the shelf compartment assembly with food servings packages (see FIG. 7 which illustrates part of such a shelf compartment assembly with a capacity of storing for example 50 food packages). At the place of consumption, i.e. in the food storage 1, 2 (FIG. 1), a corresponding store is installed for the purpose of receiving the filled shelf compartment assemblies, which are emptied one by one of their contents by means of unloading devices. The difference between the two stores consists only in loading devices being employed in the factory for loading the packages into the shelf compartment assemblies, while the corresponding devices at the place of consumption are arranged for unloading of the packages from said shelf compartment assemblies.

The shelf compartment assemblies can be designed as shown in FIGURE 7, and are indicated by 1a, 1b, 1c, 1d. 1e in FIGURE 8.

The shelf compartment assembly in FIGURE 7 comprises two lateral end walls 202 and 203, and a number of shelves 204 between them, forming the compartment assembly, into which the packages containing each one a food serving (not shown in the figure) are intended to be introduced. At the back of the shelf compartment assembly there is a support 205 to protect the packages from entering too deep into the shelves and to make it possible to transport the compartment assembly in inclined position, if desired.

Referring again to FIGURE 8, the store for housing the shelf compartment assemblies consists of a frame 206 supporting top conveyor 207 and a bottom conveyor 208. An electric motor 209 can be connected to drive both conveyors. As shown in the illustration, the compartment assemblies 1a, 1b, and 1c, are suspended on pins 210 resting on the belt of conveyor 207. At the end of conveyor 207 the compartment assemblies are delivered to a vertical guide track for stepwise downfeed in a manner described below. The compartment assembly 1d is in a position along said vertical guide track. During the stepwise downfeed movement of for example compartment 1d, the loading and emptying, respectively, of its shelves is taking place approximately at the position indicated by 211 along the track path of the compartment assembly, depending upon where the store is installed, if in the food factory or at the place of consumption.

After filling or, respectively emptying of the whole shelf compartment assembly, it is delivered to the bottom conveyor 208, where the shelf compartment assembly is suspended on its suspension pins 210.

Each one of the lateral end walls of the shelf compartment assembly is provided with a zig-zag shaped guiding groove, as shown in FIGURE 8, comprising a number of horizontal sections 212 corresponding to the number of shelves, the ends of said horizontal sections being interconnected by inclined sections 213. At the delivery of a shelf compartment assembly from the top track 207, said assembly is picked up by two guide pins 214 pointing to each other and located each one on its side of the path of the descending assembly and arranged to enter each one in its individual track 212, 213. Pins 214 normally are in the rear position showed in FIGURE 8, which is the resting position. In order to let the assembly down one step corresponding to the height of one shelf compartment, the pins 214 are caused to complete a travelling cycle consisting of one forwards and one backwards horizontal movement. Said reciprocating movement of the pins is produced by an electric motor 215 and a schematically indicated crank mechanism 216. When the pins 214 arrive at their forward end position, they are guided into the nearest located inclined groove sections 213, and during the return stroke they are guided along said groove sections to the nearest above located horizontal groove sections 212 in order to make the assembly descend one step. This descending movement is repeated after each filling and emptying operation, respectively, at point 211, so that the next shelf compartment will arrive in position for filling or emptying.

The loading device or the unloading device at point 211 is suitably combined with the driving of pins 214, so that driving motor 215 can be utilized for both of these operations. The motor is connected to drive a complete cycle, consisting of one forward and one backward going stroke, whereafter a microswitch 217 is actuated to open the circuit, until it will receive a new impulse to switch on the current again.

In addition a microswitch 218, actuated by the shelf compartment assembly, descending from track 207 to the down feed position, stops the motor 209 and thereby the two conveyors. A microswitch 219 is arranged to indicate that an assembly is located in the down feed position, which permits closing the circuit of motor 215. The completely filled or completely emptied shelf compartment assembly drops down on track 208, thereby actuating microswitch 220, which starts motor 209 in order to feed next shelf compartment assembly on track 207 to the down feed position and to move the last down fed assembly on track 208 to a side position in order to provide space for the next assembly. When track 208 is completely filled with assemblies a microswitch 221 is actuated with the resulting stoppage of the automatic functioning of the store described above.

The furnace (FIGS. 10 and 11)

In a system according to the invention, various different furnace types may be used. A so-called high-frequency or microwave furnace for dielectric heating of food is preferred and, hence, the below description is substantially, though not exclusively, concerned with such a type of furnace being made in the form of a transit furnace for straight passage through the furnace, i.e. without reversal of movement, of the objects to be heated. For reasons which will be obvious from the following description hermetically sealed standard food packages of predetermined dimensions are highly preferred. As a result of the heating procedure, steam and gases may develop within the package causing interior pressure to build up, which may result in an increase to some extent of the volume of the package by its wrapping bulging out. If the seal of the package is not completely tight, this bulging effect will not take place. If part of the package wrapping is made of material of considerably higher yielding property than the rest of the wrapping, the bulging effect mentioned will be still more pronounced serving as a more accurate indication of the degree of volumetric increase. The expression used below, "yielding wall portion" is, however, not limited to the last mentioned case, but may also refer to packages wrapped in a uniform material and of uniform wall thickness.

When food is subjected to heating in a dielectric high frequency furnace, or to a relatively quick heating in other types of furnaces, the result of the heat application to the food may be quite an uneven distribution of said heat. By way of example, when heating frozen food, it often happens that some ice is still left in the package, while the balance already has melted and the corresponding water been evaporated, so that steam pressure is created within the package. This involves the risk of the package getting untight or that it even may burst and, moreover, makes an objective measurement of the temperature of the food practically impossible, in any case as long as the package must remain tightly sealed. In many cases it is utterly important that the package remains so tightly sealed that no gases can escape, for example in such instances whereafter the heating procedure the package is moved by means of a conveyor or conveyors, which must not become dirty, while on the other side impurities must not be able to penetrate into the package.

Up to the present date attempts carried out to control the heating of such food packages, so that a desired temperature will be reached on the basis of an objective temperature measurement, therefore have failed or proved unsatisfactory. Similar difficulties have presented themselves, when attempts have been made to sort out untight packages by means of strictly objective methods.

These inconveniences can be eliminated by means of a furnace provided with a steam or gas guard, in the following simply denominated "gas guard," which is actuated in case the yielding wall portion of the package should bulge out due to the formation of a vapour or gas pressure inside the package when said package is in the heating zone within the furnace in a certain predetermined position relative to the gas guard.

A gas guard responds to a change of the shape of a package caused by a variation of the temperature of the contents of the package, is suitable for an objective control of said temperature under special conditions only and usually has to be combined with subjective measures such as visual inspection, measurement of a certain lapse of time based on an empirically determined average heating time or similar, or, when said method by reason exposed above is of little use or no use at all, by measuring the temperature without taking into consideration any control of said volumetric changes. Thus, the furnace should preferably be provided with means for combined supervision by a gas guard as well as by a temperature guard (temperature measuring device) of a type which does not require any object to be introduced into the food or even into the package. On the other hand the package wall itself may contain such an object consisting of a fusible medium or of surfaces the colours of which vary in dependence on temperature changes (detectable by photoelectric means) or other similar means.

It is to be understood that a volumetric change of a package can take place even if no vapour or gas is formed within the same, viz. if air or another gas (usually carbon dioxide used as protective gas) should undergo a thermal expansion. Thus, the gas guard may be employed to supervise a volumetric change, conditioned by said reason, and in such a case the gas guard may often be employed as sole temperature controlling device. However, it should be remembered that such a volumetric change is of much smaller proportions than a change in volume caused by the generation of vapour or gas, especially if part of the wrapping of the package consists of a readily yielding foil or similar, which immediately bulges out as a response to gas development even if the pressure within the package is very low. For a combined control by means of a gas guard and a temperature guard, the gas guard is suitably arranged to be actuated only upon development of gas within the package (thus not upon the thermal expansion mentioned) or at least is actuated in some other way, so that it responds by emitting another type of signal, when it is influenced by said formation of gas or vapour.

Under practical conditions the gas guard, on account of among other things the reasons exposed above, should occupy a certain predetermined sensing position relative to the position of the package. The package therefore should rather not comprise a bag of plastic foil filled with food or similar, excepting the case that the bag is placed in some kind of temporarily used or provisional container, for example in a compartment, box (paper box, cardboard box) or similarly dimensioned to correspond to the dimensional shape and size of the package, said container possibly forming part of a conveyer system or constituting a support for such bags.

As a rule it is most convenient to give the whole of the package a sufficiently rigid structure and determined shape that the wall portion controlled by means of the gas guard remains in at a predetermined level in relation to the gas guard and to the support upon which the package is resting as long as it is supervised by the gas guard.

The gas guard should control the heating procedure of the package, whereby the whole control can be made simpler, i.e. comprising a reduced number of individual controlling operations, if the package during its dwelling time in the heating zone is subjected to a jet of air of comparatively weak cooling effect, which brings about a condensation of steam or gas created within the package. Said exposure to a jet stream of air may go on continuously, but it may also be switched on by the gas guard, when the latter one responds to a volumetric change of the package. By such cooling procedure one can also avoid the risk of the package getting untight, i.e. ruptures in the wrapping occurring as a result of the increased pressure within the package reaching too high proportions before the control of the temperature will have brought the same down to a sufficiently lower value. In this connection it may be mentioned that a temperature of the food of 70–80° C. is usually desired, i.e. a temperature, which is more elevated than that at which the food is consumed.

FIGURE 10 is a view of a vertical longitudinal section of part of a multiple stage electric high frequency furnace designed as a transit furnace.

FIGURE 11 shows a detail of said furnace seen from above, whereby line I—I corresponds to the sectional plane according to FIGURE 10.

Figure 1:
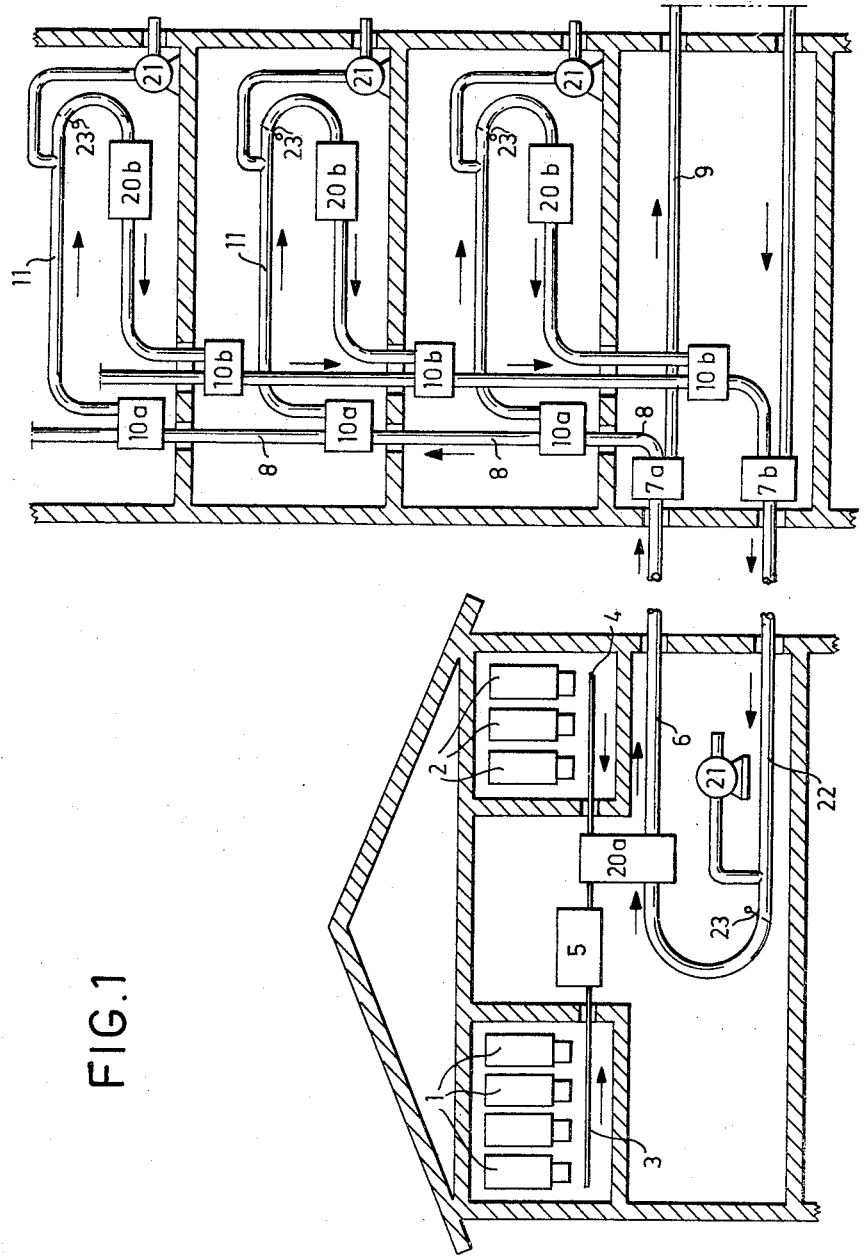
Figure 4:
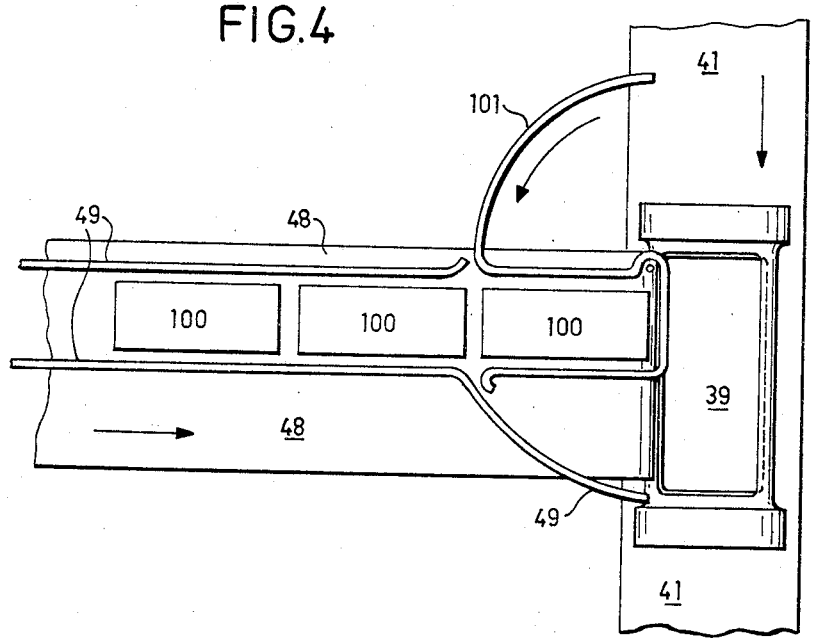
Figure 4A:
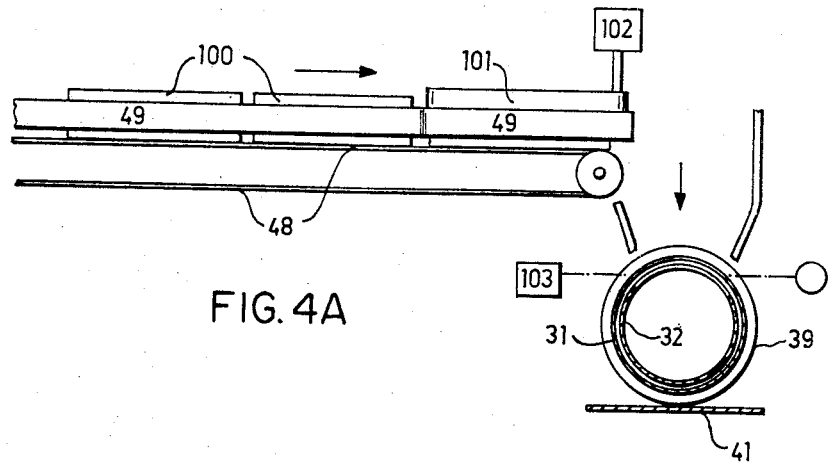
Figure 5:
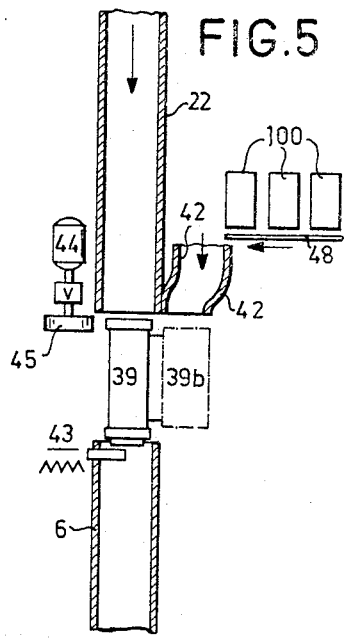
Figure 6:
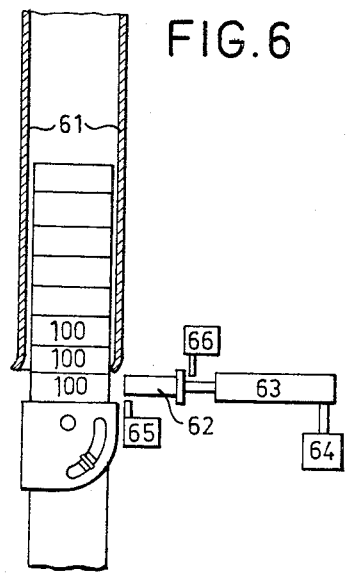

FIGURE 10 shows diagrammatically a transit furnace, suitably constructed as an ultra-high frequency furnace for dielectric heating of food. The furnace comprises several heating zones, by way of example three zones, of which only the first one, indicated by 301, and the last one, indicated by 302, are shown. An endless continuous conveyor belt 3 moves through the furnace. In the present case this belt consists of two narrow separate belt halves 3a, 3b, see FIGURE 2, but it may also be made in another way, particularly in the form of two or four round cords, yet driven by a common driving device. Conveyor belt 3 suitably consists of synthetic fiber material and in continuous movement it does not need to have a very low dielectric loss factor, because every discrete portion of the belt is fairly quickly passing through the heating zone of the furnace, thus not dwelling in the same a sufficiently long time for acquiring an unsuitably high temperature, and then being subjected to quite a good cooling down by its subsequent movement in unheated atmosphere, and consequently again enters the furnace at practically room temperature. Cooling down of the conveyor belt by any special refrigeration device therefore is deemed unnecessary, but may easily be arranged, as the furnace according to FIGS. 10 and 11 is equipped with a cool air fan 304 taking in fresh air from the outside by suction, by way of example passing across or along conveyor belt 3. Belt 3 is provide for the transportation of food packages 100a, 100b of the type shown in FIGURES 12 and 13 described in the subsequent chapter through the furnace to an output, for example via a transportation path (not shown) leading to the dispatch station 20a (FIG. 1) described above.

Food packages 100a, 100b described more in detail below are in the present case substantially shaped like rectangular bowls made of plastic material of fairly shape permanent quality, provided with a horizontal flange and on top of said flange sealed tightly by means of a not shape permanent thin plastic foil 50. If the package is in position for use with the plastic foil 50 being on the top of the package, said plastic foil is substantially horizontal or may be inclined, unless package 100a is not subjected to such heat that steam or gas is formed inside the same inflating plastic foil 50 so that it forms a clearly visible swelling or bulge as is the case with the packages indicated by 100b.

At least in the last heating zone of the furnace, but suitably in all such zones, gas guards are arranged for all packages, which in operation may dwell in the corresponding zone, possibly only for the first package or the first and the second package (in the direction of the transportation movement of the conveyor belt 3) in the zone. These gas guards in this particular case comprise a photoelectric cell 306 with an associated light source 306′ and optic equipment, if any, located in such a position that the light beam governing the photoelectric cell is interrupted or weakened if or when the foils 50 of the packages 100 are inflated to a larger or lesser extent, but the gas guards are not at all, or not in any appreciable degree, influenced by package 100a. Towards the end of at least the last zone 302 there is in addition a package position guard, also in the execution of a photoelectric cell 7 with light source 7′. This position guard is influenced by any one of the packages 5a and 5b.

In FIGURE 1 the guards 6 and 7 are indicated quite symbolically by an encircled cross, irrespective of whether their corresponding photoelectric cells concealed or not by packages 100a, 100b.

At least at the entrance and at the exit of the furnace, possibly also between the heating zones, there are high frequency filters 8, in the present case quite diagrammatically indicated, or similar means preventing any leakage worth mentioning of high frequency energy out of the heating zone in question.

At the end of the last heating zone 202 there is a temperature guard 309, which in this particular example at the same time serves as a stop or abutment for the moving food packages. The temperature guard 309 comprises for example a movable fork with two legs 309a, 309b spaced from one another such that the spacing corresponds to a somewhat larger dimension than the largest (longitudinal) dimension of a food package, disregarding the flange of the package mentioned above. The two legs 309a, 309b are rigidly connected to each other by means of a crosspiece 309c and a shank 309f, the free end of which is provided with an element 309g forming an electromagnetic armature 309g operated by means of a solenoid 309h. The top of crosspiece 309d, 309e in the form of rapidly responding thermocouples or temperature dependent electric resistors, which can be threads, laminates or heat sensitive semiconductor devices, for example so-called infrared transistors. The two legs 309a, 309b are positioned (located) between the two sections 3a, 3b of the conveyor belt, see in particular FIGURE 2.

FIGURE 10 shows the temperature guard with energized solenoid 309h with the exception that the temperature sensing elements 9d, 9e in the shown position actually contact the bottom of the food package 100a positioned immediately above, but for the sake of clearness is shown as at some distance in the figure mentioned. In this closed circuit position the sensing elements 309d, 309e contact the underside of the package, and leg 309b occupies its upper position in which it prevents package 100a from being carried away by the conveyor, the result being that the package is kept motionless for heating and temperature control, while the other leg 309a prevents any following package 100b from pushing and displacing, for example by turning action, said package 100a out of its position for temperature control. When the solenoid 309h is disconnected, the legs 309a, 309b and the armature 309g occupy their lower position (not shown) and the sensing elements 309d, 309e occupy their illustrated lower position.

From the air delivery side of fan 304 a main air duct 311 leads to all heating zones of the furnace. From said duct 311, nozzles 312 or similar means continuously or under control blow a weak stream of cooling air towards the plastic foil 50 of each package 100 to bring about a condensation of any steam, which to some slight extent could have been generated in the package. However, said cooling should not be so powerful or so long-lasting that the heating time of the package will be prolonged too much and that the gas guards 306 would no longer serve any practical purpose. Normally, but not necessarily, said cooling will be governed by some control.

The furnace operates in the following manner: Food packages 100, one at a time, with the plastic foil cover 50 forming the top of any package, are entered into the furnace by the conveyor belt 3 and a solenoid stop 310. The packages are fed into zone 301 of the furnace, where their longest dwelling time of, normally, approximately 1 minute is controlled by a time relay or another timer, which at the end of said time interval releases a stop (not shown), if still unreleased, so that the package can be moved to the next zone of the furnace. As long as the packages are kept motionless by some stop, the conveyer belt is sliding along them. Other possible arrangements can be imagined, however, see below. A package, which has been fed into the furnace is stopped at the nozzle 312 in front of one of the already mentioned gas guards 301, and thereby the high frequency energy is switched on in zone 301 in question. If the cover foil 50 of the package is bulging up and rising to a certain given level, it will interrupt or weaken the light beam of the photocell of the gas guard. The output of the photocell then actuates the stop just mentioned so that it will be moved out of its blocking position so that the package is conveyed to the next zone, in this particular case supposed to be a second zone (not shown). If the cover foil 50 does not operate the gas guard during the maximum dwelling time determined by the time relay, the stop will anyway be released by said time relay, so that the food package continues onwards. By said alternative feeding out operation from zone 301, deep frozen food packages, in which the steam is generated later than in packages not deep frozen, will remain in zone 301 during the predetermined maximum time (approx. 1 to 1½ minutes) and, thus, will be thawed, while the other food packages continue earlier not becoming quite warmed up already in the first zone 1. If the subsequent zone proves to be already filled with packages, the heat is switched off in the first zone, for example by means of a photoelectric cell with delayed action, positioned at the entrance of the second zone. When packages, forwarded by normal conveyor belt speed, pass the photoelectric cell, this cell does not switch off the heat of the first zone 1, because of the delayed action just mentioned.

The furnace zone (not shown) following subsequent to zone 301 provides additional heating and constitutes a collecting intermediate storage zone, that is a kind of "waiting room," where each package is supervised by a gas guard 306 in the same way as in the first zone. Said gas guard either interrupts the heating process or causes the package to continue to next zone, depending on the type of furnace and the chosen mode of operation of the furnace.

When the packages enter the last zone 302 and supposing that said zone can house several packages in a row on belt 3, then the foremost package 100a continues to travel on belt 3 until it interrupts the light beam of the position guard device 307. Thereby the circuit of the solenoid 309h is closed, so that the movable elements 309g of temperature guard 309 are lifted up until the temperature sensing elements 309d, 309e contact the bottom surface of package 100a and the package just enough to be disengaged from the conveyer belt and to rest, with the whole of its weight, on the temperature sensing elements 309d, 309e with the result that the package is no longer actuated by the conveyer belt. Simultaneously, also the fork legs 309a, 309b will thus be raised. The leg 309b has no true function as blockage device for the forward feed of the package, but it provides a more reliable suspension of the package in raised position and eliminates the possibility of lateral displacement. Leg 309a, lifted at the same time, prevents next package 100b from pressing on and, as the case may be, pushes it slightly backwards on the conveyer belt. In this connection it may be pointed out that the general construction principle described in the foregoing makes it easy to locate the high frequency energy radiating aperture of a high frequency furnace directly below the packages, and consequently to obtain optimal efficiency.

When a food package 100a arrives at fork 309a–309c and contacts the temperature sensing elements devices 309d, 309e, then the following happens. The preheated food in the package is subjected to additional heating. As such heating usually cannot be uniform in space if filling of the package is in homogeneous or unevenly distributed, the package must not be fed out before each of the two sensing elements indicates the desired temperature, for example 70–80° C. or slightly more. However, local stream generation at discrete points in the food occurs much earlier, before all of the food within one package has been heated approximately to the desired temperature, so that the cover foil 50 will rise and actuate the gas guard 306 which, then, interrupts or greatly reduces the heating intensity by interrupting or reducing the high frequency generation and/or by increasing the cooling air supply from nozzle 312 positioned above the package in question, for example by electromagnetic actuation completely opening an already partly open throttle valve. When subsequently the foil 50 is lowering down again owing to total condensation of the steam in the package, the high frequency energy is switched on again after a predetermined time interval, controlled by delay means such as a retarded relay, time relay, thermic relay (bimetallic), condenser resistance network or similar means. As long as the two sensing elements 309c, 309d do not indicate the desired temperature in both of the two contact points, the cycle described above will be repeated, i.e. repeated bulging and sagging of foil 50. As soon as the two sensing elements indicate the desired temperature, they cause the electromagnetic circuit 309g, 309h to be interrupted, so that the package will be released and lowered down on conveyer belt 3 to be fed out of the furnace by means of the belt.

However, there may be additional packages 100 behind the first package thus supervised in zone 302. Because said additional packages usually arrive later, it is highly improbable that they require to be fed out earlier than the first package. However, one can for example design and connect the gas guards 306 controlling these additional packages in such a way that they induce a reduction of the heating effect for these packages, for example by controlling a device shielding, deflecting and/or absorbing said effect, or else by increasing the cooling air supply as already mentioned.

Referring to the temperature guard 309 described above, it is essential to check the temperature at least at two different points on the outside of the package. Thus, the two sensing elements 309c, 309d control individual switches (not shown) connected in series, such as relays, gates etc., which will be switched on (rendered conductive), when the desired temperature has been reached. When the circuit of the two switches is closed the high frequency generator is made inoperative. A switch controlled by the last gas guard 306 located above 309 can be connected in parallel with the switches such as to interrupt the high frequency energy as long as the light beam of the photocell means of the gas guard is shielded and also during a certain subsequent delay period as already mentioned.

However, one can determine the average external temperature of the package by way of one (or more) temperature sensing elements of elongated shape. Supposing such a device being designed as a long resistance tape or layer, being sensitive to variations of the temperature and extending in the longitudinal direction of the conveyor belt 3, substantially in touch with the whole length of the food package, then the temperature guard may be arranged to interrupt the heating energy as soon as the resistance has reached an average value corresponding to the desired temperature of the food.

Temperature measurement by direct contact between sensing elements and the package may, however, be substituted by another type of temperature measurement, for example by a radiation pyrometer sensitive to infrared light, or a semiconductor diode or transistor sensitive to heat, provided that the temperature is measured at least at two different points, in the present case suitably at many points, which together form an elongated line or surface, the temperature sensing device being spaced from the food package and directed or focused onto a large surface of same, suitably towards a large portion of the surface of the plastic cover foil 50, the heat conductivity of which is superior to, i.e. the insulation being interior, to that of the other walls of the package.

Alternatively the temperature guard need not be located entirely outside of the package, at a convenient point of the package it can be provided with one or several defined marks or with an elongated mark of some material sensitive to temperature, for example with so called thermocolor, which definitely or temporarily changes colour and/or degree of brightness, when a predetermined desired temperature has been reached. Such change of colour can be readily detected by means of photoelectric cells, which in addition may perform the same operations as the elements 309d, 309e described above. Also other types of marks sensisitive to temperature may be used, for example materials mechanically sensitive to temperature as a wall portion, which softens at a desired temperature, marks of waxy substances with softening behaviour etc., the action of which easily is detected by mechanical, optical or electrical (galvanic, inductive or capacitive) means.

The solenoid device 309g, 309h can be substituted by a motor or a mechanism capable of lifting the sensing elements 309c, 309d which mechanism can be mechanically connected with, and driven by, the conveyer belt 3 or the driving device of the belt. Such mechanical connection may be effectuated by electrical means, for example by electromagnetically operated mechanical engagement of some kind like a solenoid-operated pawl which by magnetical actuation will drop into a gear or ratchet wheel belonging to the driving means of the conveyer belt 3, or a so-called one-revolution clutch.

The gas guard 306 has been described above as comprising a photoelectric cell. However, it may be a mechanical, pneumatical or capacitive device. In the present example, mechanical operation by the cover foil 50 would require a high mechanical sensitivity. Pneumatical operation, would not require auxiliary electrical means as a throttle, a shield reducing the high frequency etc. may very well be controlled entirely by mechanical and pneumatical means, respectively. By way of example, the gas guard (not shown) may comprise a suction nozzle connected to an air duct with comparatively weak vacuum, whereby said vacuum rises and, by means of a device sensitive to pressure changes (electric contact, purely pneumatically operated slide for governing a jet of compressed air, for example the one in nozzle 12 etc.) will increase the cooling of the food package and/or will reduce the intensity of the heating energy. A bolometer may also be used as gas guard, either acting independently, whereby cover foil 50 shields the heat radiation or an air jet of the bolometer (depending upon if the bolometer resistance in its inactive stage is warmed by heat radiation or cooled by an air jet), or acting in connection with a pneumatical or mechanical sensing device actuating the so called flag (movable element shielding heating and air respectively) of the bolometer.

Mechanical sensing, suitably by means of a mechanically operated electric contact, is a convenient means especially for packages not having windows of plastic foil or similar, for example when the wrapping of the package entirely consists of carboard or relatively rigid plastic material.

Supervision of the temperature exclusively by means of a gas guard may be sufficient or necessary in such cases, where the heat conductivity (or heat insulation) of the package wrapping and the heat resistance have such characteristics that temperature measurement by means of some kind of temperature guard will be unreliable, unduly delayed or even impossible.

At a combined supervision by gas guard and temperature guard one and the same wall portion may be used, for example the cover foil 50 mentioned above or a thin but tight fitting window in the package for sensing both the bulging action (gas guard) and the increase of the temperature (temperature guard).

In the arrangement of the furnace and package with cover foil 50 as described and shown in FIGURES 10 and 11 the temperature sensing device may alternatively contact one or more of the lateral surfaces of the packages. If both end surfaces of the package are used, the sensing device may simultaneously serve the purpose of firmly holding the package in a determined position below the gas guard and the associated nozzle 312 without being raised from the conveyer belt 3. Individual stops are, then, not required. Also when the contact is arranged to engage one lateral surface of the package only (a counter support being applied against the opposite lateral surface) or to engage the two lateral surfaces of the package, the package may be kept in firm stationary position by means of the sensing device.

The gas guard or guards can be used to sort out untight packages, for example when at least one of the two temperature sensing elements indicates the desired temperature value, or rather another higher temperature, though the cover foil has not previously exhibited any bulging or inflation the package can be considered untight, and its separation could be effectuated by means of the criteria just mentioned. Alternatively one can sort out such packages, which during the whole of their passage through the furnace have not been exhibiting any bulging of their cover foil 50. Such packages can be identified and sorted out in different ways, for example by an inflated portion resulting in the application of a sorting-out mark on the package to be sensed for example by photoelectric means, whereby the mark is applied by spray in case any bulging has failed to appear, said spraying being effectuated by means of a conventional electrically operated marking device, normally inactive, but entering into action, when the package is passing past a sensing point without previously having been prepared, for example by having been made inactive, by a bulging signal from the gas guard. In its simplest execution the furnace may be designed to the effect that a cover foil of a package when getting inflated will touch a color pad or similar, or by means of the gas guard will trigger a color gun when bulging, said gun applying an "approved-mark" onto the package, so that all packages not provided with said "approved-mark" will be sorted out, conveniently after having left the furnace. This operation may be effected by the mark being sensed (suitably by photoelectric means)

at the same time as said package actuates a guard (photoelectric cell device, mechanically governed contact or similar). This guard operates a package ejector if the guard is actuated without an "approved-mark" having been sensed on the package simultaneously with, or previous to, the actuation of the guard.

There are also other possibilities to sort out and/or mark untight packages by means of controls actuated by the bulging action. Packages, the contents of which, for some reason or other, cannot at all, or in any case cannot within a predetermined maximum period, be warmed up to the desired temperature, are to be classified in the same category as untight packages. The risk of such packages appearing exists especially in connection with high frequency furnaces, if such a furnace is improperly set, in which case numerous packages, or all of them, will be sorted out, thus signalling a deficient furnace functioning, or if packages being unsuitable for such for furnaces are employed, or if the contents of the package has been subjected to certain undesired chemical or physical influences.

The furnace may also very well be used also for untight packages, food placed on plates and dishes, etc. Gas guards 306 should then preferably be rendered inoperative, either manually or automatically. Automatic inactivity of the gas guards may be obtained by means of a similar guard sensing the vertical level of any package being about to enter the furnace. If food servings or other objects, which cannot and shall not be tested with respect to bulging of the type mentioned above, should be introduced into the furnace, and their height would be such as to affect anyone of the other gas guards, then the height or vertical level guard arranged at the furnace entrance will be actuated and will render all of the other gas guards temporarily inoperative. If the objects introduced do not influence the height guard, then the gas guards should not, or need not, be inactivated, provided that such objects of other types than those to be tested by the gas guards are not permitted to remain in the furnace during an unlimited time or too long a time. This can be prevented by time and/or temperature control or by subjective (not automatic) observation and manual operation.

In many cases it may suffice to provide the furnace with automatic supervision of temperature at one point only on a food package. In addition the furnace may in practice very well have one single heating zone only, but the quality of the heating process is much superior if more than one zone is provided.

A furnace of the present type is especially useful and advantageous for heating vacuum type packages. Also vacuum type packages may well have a very yielding wall portion as cover foil 50, which wall normally is in touch with the contents of the package, as long as the package is not heated. The practical possibility has been proved by tests and is also known from foodstuffs wrapped in plastic vacuum bags, for example roasted peanuts in plastic vacuum bags, which since many years have been on the market.

Figure 13:
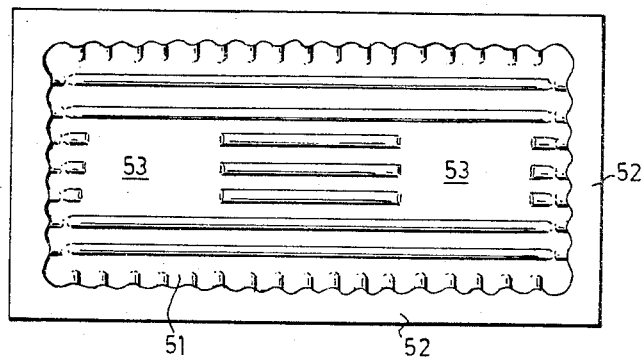
Figure 12:
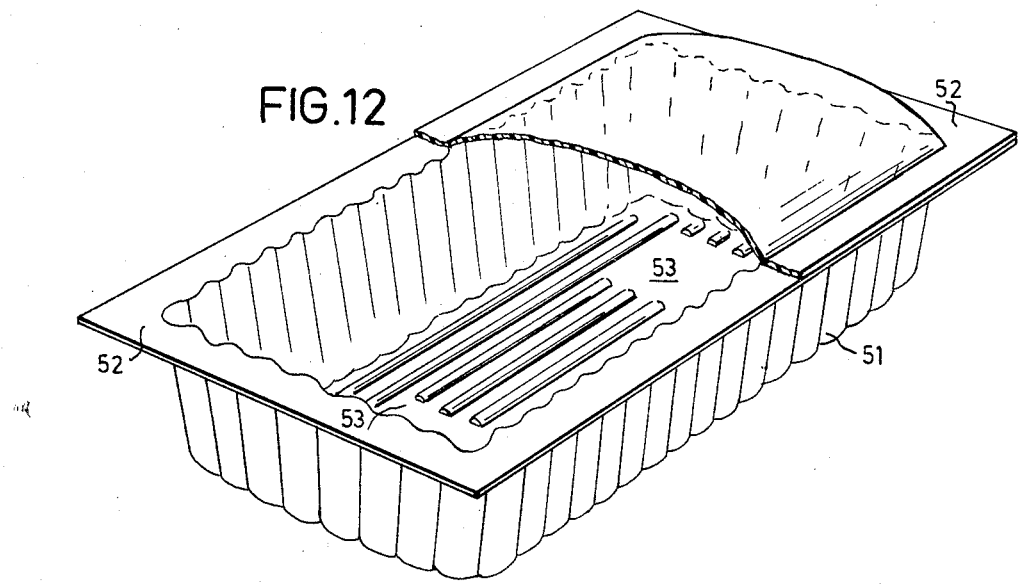

The food packages (FIGS. 12 and 13)

The FIGURES 12 and 13 illustrate a food package especially siutable for a furnace according to the invention and corresponding to the packages 100 referred to above. The wrapping comprises a square bowl 51 having a plane horizontal topflange 52 folded outwards, onto which a cover foil 50 of plastic material or of thin but strong dense paper or similar is welded or glued, such that the foil is not tightly stretched but sagging and yielding. The four lateral surfaces of bowl 51 are vertically corrugated, and the bottom surface is corrugated in the direction of its longest extension, said direction coinciding with the direction of travel of conveyor belt 3 in FIGURES 10 and 11. The bottom of the bowl, however, is provided with two uncorrugated surface portions 53. Suitable dimensions of the bowl are in the range: length 180 mms. not counting the flange 52, width 80 mms. also not counting the flange, and height 30 mms. The corresponding dimensions including the flange 52 are approximately 100 x 200 x 30 mms. The wall thickness of the bowl is approximately 0.5 mm. The bowl 51 and suitably also the cover foil 50 consist of inflammable, suitably self-igniting plastic material, cardboard impregnated with plastic material, etc., so that used packages can be destroyed by being burned.

The problems solved by the package design described above are the following ones. The package must be sufficiently rigid to permit easy handling by manual manipulation as well as by automatic means such as those described above, not withstanding the fact that the package is weakened by the cover foil 50 and, perhaps, by heating. On the other hand the package must be cheap, and the heat conductivity of the bowl 52 and its heat capacity shall be such as to permit quick temperature measurement on the outside of the bowl. All the above requires that the bowl is made of such material, and has such a shape and wall thickness that it appears hardly possible to comply with all of those requirements and certain other ones in addition. The bowl is therefore made mechanically more rigid both by the corrugations and by the flange 52 which at the same time constitutes an especially suitable bonding surface for cover foil 50 in order to obtain a tight seal. Moreover, automatic sealing by machine applying the cover foil will be very much simplified by said wide flange extending in one single plane. However, the corrugation would make a direct temperature sensing operation utterly hazardous or impossible. Therefore, smooth sensing surfaces are provided in the corrugated portion without appreciably weakening the rigidity of the bowl 51. Even if the packages are to be used in another type of furnace than those referred to above, it should anyhow be possible to use them also in a furnace of a type referred to above, so that the same standard type of package may be used in both cases, which is of great importance for producing, filling and storing of packages filled with products for different users.

Figure 7:
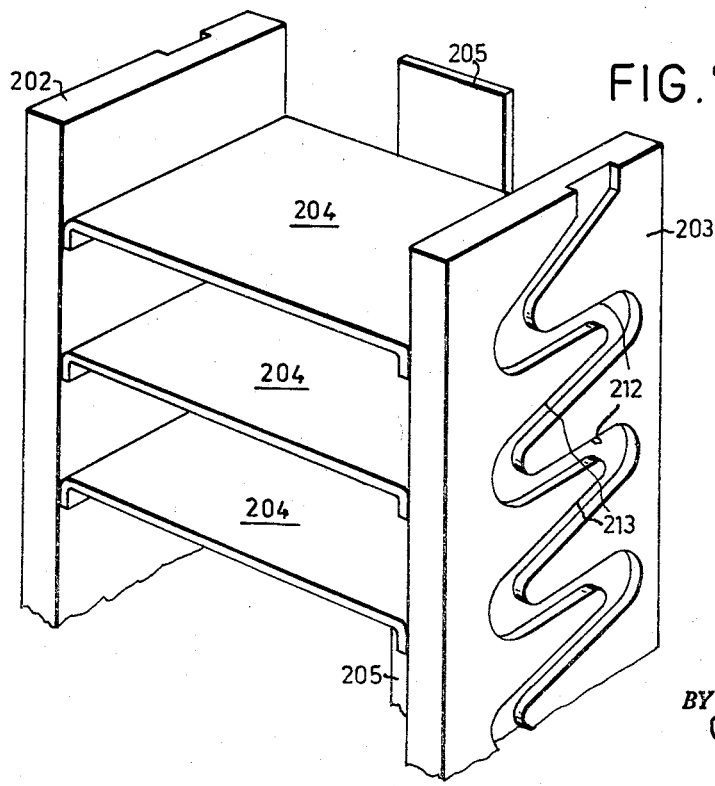

Moreover the packages according to FIGS. 12 and 13 are highly suitable for transportation by means of pneumatic tube conveyor systems, such as those referred to above, and there are no particular specific requirements with respect to pneumatic tube size (diameter) or specially designed pneumatic tube conveyer carriers. In addition, the packages may be stacked one on top of the other and as their two horizontal surfaces are plane, they will be in a stable steady position also in a moderate stack. The packages are, further, very well suited for storage and distribution by means of storage bins or hoppers and containers such as in food storages of the type described above with reference to the FIGS. 7 and 8. Finally it may be mentioned that the packages are made to permit eating directly out of the same after the cover foil 50 has been removed (for example torn off), for which purpose the packages may be inserted in trays (not shown) of integral plastic material, pressed in one single piece. Such trays should have recesses for locating the packages, so that the flange 52 and/or bottom surface 53 of one or two packages will rest upon the top surface of the tray and upon the bottom surface of said locating recesses, respectively. Such a tray is suitably provided with locating recesses for two adjacent packages of the type shown in FIGS. 12 and 13, one package at the side of the other (for example one package for vegetables and potatoes, and the other one for meat and gravy, or one package for the main dish and another one for the dessert), and further locating recesses for salt, cutlery, eating implements and a cup or glass for beverages. Eating implements to be used only once, salt bag, etc. may be included into the food package, which besides may be split in two compartments by means of a dividing wall integral with the bowl of the package.

Example of empirical operational data

On testing a furnace in accordance with FIGURES 10 and 11 having three heating zones, fed with filled food packages according to FIGURES 12 and 13, the following values were obtained or established. A package fed into the furnace remains during maximum approximately one minute in zone 301 before it continues its travel to the second zone (not shown in the drawings). If the second zone is already filled with packages, the heating process in zone 301 is interrupted or reduced until the feeding in operation into the next zone can take place. In said second zone (not shown) the usually intermittent heating time, controlled by means of the gas guards, varies and depends upon when the third (last) zone 302 will be able to receive further packages from the preceding zone, the main purpose of which is to provide such intense preheating that the dwelling time in the third zone 302, where the temperature control takes place, will last for approximately one minute or less. The packages can and may be permitted to acquire their final temperature already in the second zone (not shown). The total dwelling time in all of the zones of the furnace amounts to approximately 1.5 to 4 minutes, and varies somewhat for sub-zero frozen food, normally refrigerated food and not refrigerated food.

Three furnace sizes for having a connection power of 2.5 kva., 7.5 kva. and 15 kva., respectively have been tested. In the two larger types 80 respectively 160 deep-frozen food packages (each containing approximately 200 grams of food) could be prepared during one hour. As to food from refrigerators the hourly output was 80, 240 and 480 packages respectively. Said furnaces, as well as other similar furnaces, were, or may be, equipped with stops of different design and in larger numbers than described above, to stop and to release food packages, and further with elements for control of the passage of food packages through the furnace. The above values have been obtained when the food temperature was 70–80° C. when leaving furnace exit. The temperature of packages according to FIGURES 12 and 13 decreases by 3° C. only during a period of 15 minutes and, hence, are sufficiently heat insulating for all normal purposes in spite of the big thin cover foil 50 and the small wall thickness of bowl 51. The above values of temperature and dwelling period in the furnace have been measured for all kinds of ready cooked dishes like soup, complete servings of potatoes and meat or fish, hot dessert and similar, so that a substantially total sterilization of the contents could be obtained.

Other details of the system (FIG. 1)

The system may be equipped with means to prevent a disturbance by traffic congestion, for example immediately ahead of the furnace, the dispatch station or the main switch point, and further to prevent collision between two order signals (orders of servings) simultaneously sent from different points, especially if they concern approximately simultaneous delivery of a large number of servings to each one of several receiving points 20b, FIG. 1. Moreover, it may be desirable to give preference to some orders. Finally, a traffic congestion should not involve unnecessary delay for packages already warmed, which therefore after leaving the furnace should have a preferential treatment with respect to packages of ambient temperature. Suitable means to fulfill these requisites are described in the already mentioned specification of the Swedish patent application 4386/62 and may be carried out and varied according to need.

The dispatch station 20a, the furnace 5, the main switch point 7 as well as the transportation paths between them may be constructed for parallel transportation of filled carriers and for quicker dispatch of same. Means to this effect are described above and in said patent application, and there are known means to this end, for example in connection with pneumatic tube conveyer switch points, or they may be built according to the need and requirements in each individual case.

It is kown, how pneumatic tube conveyer carriers may be automatically guided to the desired point of destination, i.e., the desired receiving end station 20b. By way of example, markings for photoelectric reading and direct guiding means by use of order giving signals have already been mentioned, but also markings on addressed packages 100 may be automatically readable through openings or windows in the pneumatic conveyer carriers. It is also possible to provide the carriers themselves with addressing means known per se, arranging that the order signals directly or indirectly guide such means at the dispatch station 20a in connection with the delivery of the carriers ordered at the same time as the order for food servings, this in spite of the (known) difference in time between the delivery operation of the packages from the storage bins 1, 2 by way of the order signals and the delivery of the packages at the dispatch station 20a.

What I claim is:

1. A pneumatic tube conveyer transportion system including means for loading and unloading pneumatic tube conveyer carriers which are opened and closed, comprising a pneumatic tube conveyer, at least one dispatch station in said conveyer system,
   a delivery means to deliver portions of the goods to be conveyed to said dispatch station, said dispatch station comprising
   (i) a loading device for loading one of said portions in each of said pneumatic conveyer carriers,
   (ii) means to stop each incoming carrier in a predetermined axial position,
   (iii) means to rotate said carrier into a predetermined angular position,
   (iv) means to open said carrier so that said carrier can receive a portion from the loading device,
   (v) means to detect when said carrier has been loaded,
   (vi) means to close the loaded carrier, and
   pneumatic tube conveyer, whereby when a carrier arrives in said dispatch station it is positioned, opened, loaded, closed, and is then dispatched to the pneumatic tube conveyer, and
   at least one receiving station in said conveyer system, said receiving station having means to open each incoming carrier, means to unload said carrier of the portion of goods contained therein, and means to return said carrier into said pneumatic tube conveyer.

2. The pneumatic tube conveyer transportation system of claim 1 wherein said receiving station contains
   means to stop each incoming carrier in a predetermined axial position,
   means to locate said carrier into a predetermined angular position,
   means to open said carrier so that it can be unloaded, whereby when a loaded carrier arrives in said receiving station it is positioned, placed in the predetermined angular position and opened, unloaded, and then returned into said pneumatic tube conveyer.

3. A system according to claim 2, characterized in that the loading device is such that the portion by its own gravity slides or drops down into the open carrier.

4. A system according to claim 2, characterized in that the loading device is provided with an electrically actuated pneumatic element for loading the open carrier with the portion.

5. A system according to claim 2, characterized in that the dispatch station includes a conveyer belt to convey each incoming carrier from a pneumatic tube to said carrier stopping means and then, when this means has been inactivated, to an output pneumatic tube or pneumatic conveyer tube switch point.

6. A system according to claim 2 containing (i) a photoelectric cell to establish the termination of the unloading of the carrier, and (ii) means for closing the carrier before leaving the receiving station.

7. A system according to claim 6, characterized in that the receiving station is arranged to unload the carrier such that the carrier is opened in a position where the opening of the carrier is facing downwards, so that the portion leaves the carrier at least partially assisted by fravity.

8. The pneumatic tube conveyer transportation system of claim 2 containing a storage means in which the portions of the goods to be conveyed to said dispatch station are stored, said storage means contaning means co-acting with said delivery means whereby portions of goods are taken from said storage means and delivered to said dispatch station.

9. A method for conveying goods in carriers in a pneumatic tube conveyer transportation system whereby said carriers are loaded at a dispatch station and subsequently unloaded at a receiving station without being removed from said system comprising delivering portions of goods to be conveyed in said pneumatic tube conveyer system to a dispatch station in said system, stopping a carrier in a predetermined axial position in said dispatch station, positioning said carrier in a predetermined angular position, loading a portion of the goods into said carrier, and then delivering said carrier into the pneumatic tube conveyer, sending said carrier to at least one said receiving station wherein it is opened and unloaded of said goods, and thereafter returning said carrier to said pneumatic tube conveyer.

10. The method of claim 9 wherein when a loaded carrier is received in said receiving station it is stopped at a predetermined axial position, positioned in a predetermined angular position, and then unloaded.

11. The method of claim 10 wherein in said receiving station, said predetermined angular position of said carrier is one wherein said carrier is positioned to be opened with the opening at the bottom thereof.

12. The method of claim 11 wherein said carrier arrives at said dispatch station empty and wherein said carrier is positioned in said dispatch station with said opening at the top and wherein said portion of the goods is gravity-fed into said open carrier.

References Cited

UNITED STATES PATENTS

| | | | |
|---|---|---|---|
| 242,459 | 6/1881 | Leaycraft | 243—34 |
| 3,104,078 | 9/1963 | Buchwald | 243—19 |

FOREIGN PATENTS

| | | |
|---|---|---|
| 1,208,692 | 1/1966 | Germany. |
| 1,211,548 | 2/1966 | Germany. |

HARVEY C. HORNSBY, Primary Examiner

U.S. Cl. X.R.

219—10.71; 220—67; 221—81; 243—19, 34, 38, 39